United States Patent [19]

Solow

[11] Patent Number: 5,793,120
[45] Date of Patent: Aug. 11, 1998

[54] VEHICLE MUSICAL APPARATUS

[76] Inventor: Joseph E. Solow, 6 Julia Cir., Dix Hills, N.Y. 11746-8216

[21] Appl. No.: 960,152

[22] Filed: Oct. 29, 1997

[51] Int. Cl.$^6$ ..................................... H04B 1/16
[52] U.S. Cl. .................... 307/9.1; 381/86; 340/825.72
[58] Field of Search ........................ 307/9.1, 10.1; 455/345, 350; 381/188, 86, 105; 340/825.69, 825.72

[56] References Cited

U.S. PATENT DOCUMENTS 5,319,716  6/1994  McGreevy .......................... 455/345
5,583,477  12/1996  Yen .................................. 340/825.72
5,684,470  11/1997  DeLand et al. ..................... 340/825.69

*Primary Examiner*—Richard T. Elms
*Attorney, Agent, or Firm*—Baker & Botts, LLP

[57] ABSTRACT

A vehicle musical apparatus includes an electronic unit and speaker arranged to be mounted in the engine compartment of a vehicle. A remote control radio transmitter is provided for activating the musical apparatus, eliminating the need for installing wire connections between the passenger compartment and the engine compartment.

4 Claims, 1 Drawing Sheet

VEHICLE MUSICAL APPARATUS

BACKGROUND OF THE INVENTION

This invention relates to musical apparatus for vehicles, and particularly to such apparatus in which tunes are electronically synthesized. Known vehicle musical apparatus includes air horns and electronic sound synthesizers. Both are inconvenient and difficult to install.

In particular, the known arrangements are preferably mounted under the hood of the vehicle and require wiring to the interior of the vehicle for control purposes. In connection with musical air horns, the known arrangements are also difficult to mount because of the space required for horns and compressors.

It is therefore an object of the invention to provide an improved vehicle musical arrangement that is easy to install and requires a minimum of space for installation.

SUMMARY OF THE INVENTION

In accordance with the invention, there is provided a musical apparatus for a vehicle comprising an electronic unit having a digital memory for storing data comprising at least one sound sequence, a remote control receiver and a data reading circuit. The remote control receiver is arranged to respond to a remote control signal to provide an output control signal to the data reading circuit to cause the data reading circuit to provide an electrical signal representing the sound sequence. The apparatus further includes a speaker for converting the electrical signal to sound and a remote control transmitter for sending the remote control signal.

The apparatus preferably is arranged to selectively play one of a plurality of stored sound sequences. The electronic unit preferably includes an amplifier and the remote control transmitter and receiver can be arranged to control the gain of the amplifier.

For a better understanding of the present invention, together with other and further objects, reference is made to the following description, taken in conjunction with the accompanying drawings, and its scope will be pointed out in the appended claims.

DESCRIPTION OF THE PREFERRED EMBODIMENT

Figure 1:
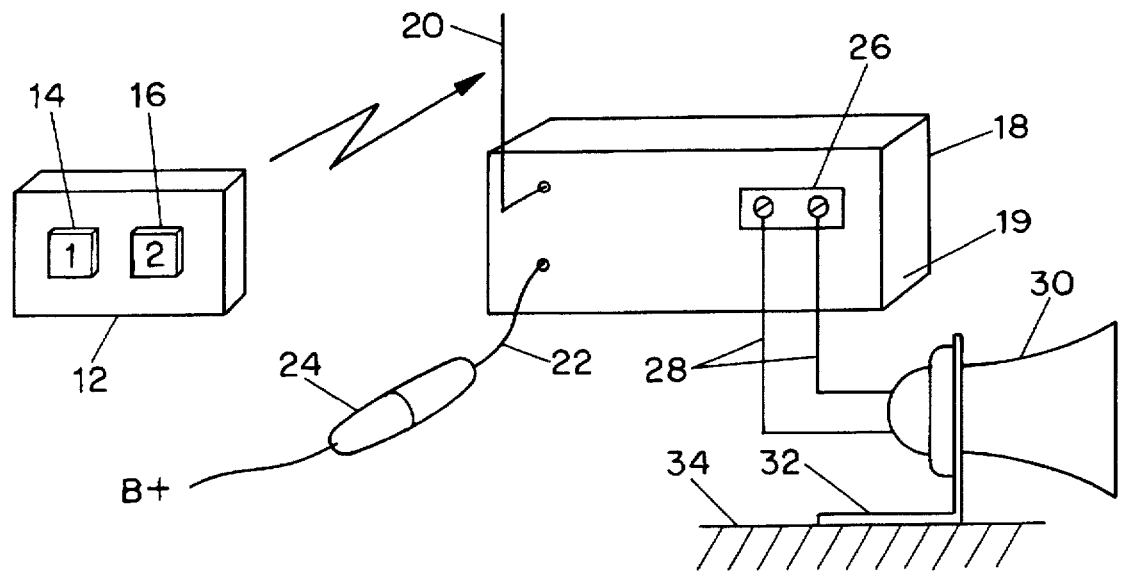
FIG. 1 is an illustration of an embodiment of the present invention.

Referring to FIG. 1, according to the present invention there is provided a vehicle musical apparatus for easy installation in a vehicle. The apparatus includes a remote control transmitter 12 having two buttons 14 and 16 corresponding to alternate musical tunes to be played by the apparatus. Transmitter 10 is of conventional design and is substantially identical to pocket size transmitters used to activate vehicle alarms, locks, etc. Transmitter 10 is intended to either be carried by the user, or alternately may be mounted, for example with tape, in the passenger space of the vehicle.

Electronic unit 18 is arranged to be mounted under the hood of the vehicle using flanges 19. Unit 18 includes a radio receiving antenna 20, a power cord 22, which may include an in-line fuse 24, and speaker output connection 26. Wires 28 connect speaker 30 to electronic unit 18, so that speaker 30 can be mounted by bracket 32 to a convenient surface 34 under the vehicle hood. Because unit 18 and speaker 30 are both mounted, either independently or together under the hood with only a connection to the vehicle power supply, installation does not require threading wires between the engine and passenger compartments of the vehicle. It will be recognized that it is also possible to arrange the electronic unit as an integral assembly with speaker 30.

Figure 2:
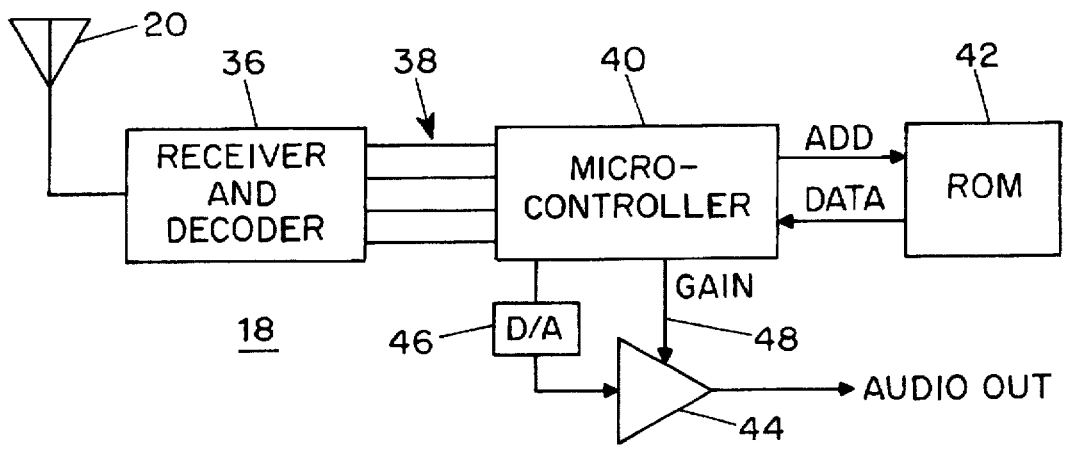
FIG. 2 is a block diagram of the electronics unit of the FIG. 1 apparatus.
Figure 3:
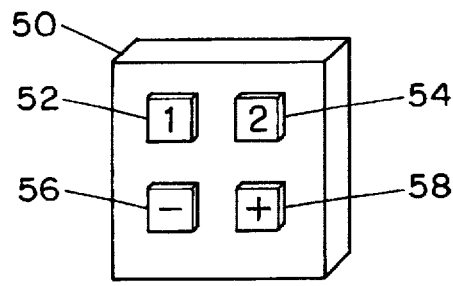
FIG. 3 is an illustration of an alternate transmitter for use in the present invention.

Referring to FIG. 2, there is shown a block diagram of the electronic unit 18 of the present invention. A receiver and decoder 36 receives the coded RF signal from antenna 20 and provides output control signals on leads 38 to microcontroller 40. Microcontroller 40 is provided with a control program to respond to the output control signals. A control signal may indicate a particular musical sequence to be played by the device, e.g. song "1" or song "2" as designated by the control buttons 14, 16 on remote control transmitter 12. ROM 42 is provided with data corresponding to the sound sequences for each available song. Micro-controller 40 responds to the output control signal to read the corresponding sequence of sound data. The sound data is provided as an output data sequence and converted to an analog signal in D to A converter 46. Amplifier 44, which may be, for example a 15 watt audio amplifier, increases the signal level before providing the output audio electrical signal to speaker 30.

In a further arrangement the remote control transmitter 50, illustrated in FIG. 5, includes selection buttons 52, 54 and further includes volume control buttons 56, 58. Buttons 56, 58 may correspond to two volume levels, or may select among a greater number of volume levels by stepping the level up or down each time one or the other button is operated.

Receiver 36 is designed to recognize the volume control signals and provide corresponding output control signals to microcontroller 40. The microcontroller then provides an appropriate gain control signal on lead 48 to amplifier 44.

Those skilled in the art will recognize other variations of the invention. For example, ROM 42 may be part of microcontroller 40. Further, the microcontroller may be implemented as a specialized sequencing circuit instead of a programmable circuit. It is also possible to provide the entire electronic unit, with the possible exception of the audio amplifier as a specially designed integrated circuit. Obviously more than two musical selections can be provided by increasing the number of control buttons and storing additional data.

While there have been described what are believed to be the preferred embodiments of the invention, those skilled in the art will recognize that other changes and modifications may be made thereto without departing from the spirit of the invention, and it is intended to claim all such changes and modifications as fall within the true scope of the invention.

I claim:

1. Musical apparatus for a vehicle comprising:

an electronic unit having a digital memory for storing data comprising at least one sound sequence, a remote control receiver for receiving at least one remote control radio signal and for providing at least one output control signal in response thereto, a data reading circuit, responsive to said output control signal for reading said data from said memory in sequence and for providing an electrical signal representing said sound sequence;

a speaker for converting said electrical signal into sound, and a remote control transmitter for transmitting said remote control radio signal.

2. Musical apparatus as specified in claim 1 further comprising an amplifier for amplifying said electrical signal.

3. Musical apparatus as specified in claim 1, wherein said digital memory stores as plurality of sound sequence, wherein said remote control receiver receives a plurality of said remote control radio signals and provides an output control signal corresponding to a received radio signal and wherein said data reading circuit reads data for a sound sequence corresponding to said output signal and wherein said transmitter is arranged to send a selected remote control radio signal.

4. Musical apparatus as specified in claim 1 wherein there is provided an amplifier having selectable amplification, wherein said remote control transmitter and said remote control receiver are further arranged to send and receive amplification control radio signals, and wherein said remote control receiver provides an amplitude control signal to said amplifier in response to said amplification control radio signals.

\* \* \* \* \*

UNITED STATES PATENT AND TRADEMARK OFFICE
CERTIFICATE OF CORRECTION

PATENT NO. : 5,793,120
DATED : August 11, 1998
INVENTOR(S) : Joseph E. Solow

It is certified that error appears in the above-identified patent and that said Letters Patent is hereby corrected as shown below:

On the title page, Item [56] References Cited insert the following:

OTHER DOCUMENTS

| | | |
|---|---|---|
| | | "Animal House" Electronic Horn Model 345, Wolo Automotive Products Catelog, Date Unknown. |
| | | "Music Maker" Model 335, Wolo Automotive Products Catelog, Date Unknown. |
| | | "Musical Horns", Wolo Automotive Products Catelog, Date Unknown. |
| | | |

Signed and Sealed this

Ninth Day of March, 1999

Attest:

Attesting Officer

Q. TODD DICKINSON

Acting Commissioner of Patents and Trademarks